United States Patent
Du et al.

(10) Patent No.: US 10,839,620 B2
(45) Date of Patent: Nov. 17, 2020

(54) APPARATUS AND METHOD FOR MANUALLY ACTIVATED WIRELESS TRANSFER OF OPERATIONAL AND PERFORMANCE DATA

(71) Applicant: Honeywell International Inc., Morris Plains, NJ (US)

(72) Inventors: Tangwen Du, Beijing (CN); Castle Gu, Shanghai (CN); Feng Jing, Beijing (CN); Pengfei Zhan, Shanghai (CN)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 16/327,475

(22) PCT Filed: Sep. 23, 2016

(86) PCT No.: PCT/CN2016/099802
§ 371 (c)(1),
(2) Date: Feb. 22, 2019

(87) PCT Pub. No.: WO2018/053775
PCT Pub. Date: Mar. 29, 2018

(65) Prior Publication Data
US 2019/0206152 A1 Jul. 4, 2019

(51) Int. Cl.
*G07C 5/00* (2006.01)
*B64F 5/40* (2017.01)
*G07C 5/08* (2006.01)

(52) U.S. Cl.
CPC ............ *G07C 5/008* (2013.01); *B64F 5/40* (2017.01); *G07C 5/085* (2013.01)

(58) Field of Classification Search
CPC ............ G07C 5/008; G07C 5/085; B64F 5/40
(Continued)

(56) References Cited

U.S. PATENT DOCUMENTS 6,181,990 B1   1/2001   Grabowsky et al.
6,654,386 B2   11/2003  Nahapetian et al.
(Continued)

FOREIGN PATENT DOCUMENTS

CA         2897764 A1     1/2016
CN       100342305 C     10/2007
(Continued)

OTHER PUBLICATIONS

International Search Report and Written Opinion dated Mar. 30, 2017 in International Application No. PCT/CN2016/099802 (7 pages).
(Continued)

*Primary Examiner* — Kerri L McNally
(74) *Attorney, Agent, or Firm* — Bookoff McAndrews, PLLC (57) ABSTRACT

A manually activated communications system is provided. The manually activated communications system includes a manually activated switch, a monitoring system configured to store operational and performance data of a vehicle, and a radio, coupled to the monitoring system and the manually activated switch, which may be located within or outside the monitoring system. The manually activated switch, monitoring system and radio are contained within the vehicle. The radio is configured to wirelessly transmit the operational and performance data of the vehicle to a portable processing system, proximate to the vehicle, when the vehicle is parked and the manually activated switch is actuated.

16 Claims, 4 Drawing Sheets

(58) Field of Classification Search
USPC ........................................................ 340/945
See application file for complete search history.

(56) References Cited

U.S. PATENT DOCUMENTS

| | | |
|---|---|---|
| 6,671,589 B2 | 12/2003 | Holst et al. |
| 6,816,728 B2 | 11/2004 | Igloi et al. |
| 6,915,189 B2 | 7/2005 | Igloi et al. |
| 7,010,651 B2 | 3/2006 | McGuffin |
| 7,103,456 B2 | 9/2006 | Bloch et al. |
| 7,203,630 B2 | 4/2007 | Kolb et al. |
| 7,489,992 B2 | 2/2009 | Valette et al. |
| 7,835,734 B2 | 11/2010 | Eckert et al. |
| 7,908,053 B2 | 3/2011 | McGuffin et al. |
| 8,108,095 B2 | 1/2012 | McGuffin et al. |
| 8,301,196 B2 | 10/2012 | Kauffman et al. |
| 8,326,359 B2 | 12/2012 | Kauffman |
| 8,744,372 B2 | 6/2014 | Ziarno et al. |
| 9,191,053 B2 | 11/2015 | Ziarno et al. |
| 2002/0035416 A1* | 3/2002 | De Leon ............... G07C 5/008 701/14 |
| 2003/0130769 A1* | 7/2003 | Farley ................ H04B 7/18506 701/3 |
| 2004/0078123 A1* | 4/2004 | Igloi .................... B64F 5/60 701/31.4 |
| 2007/0072639 A1 | 3/2007 | Frost et al. |
| 2008/0217996 A1* | 9/2008 | Niss ...................... H04B 3/542 307/9.1 |
| 2011/0288759 A1* | 11/2011 | Saugnac ................ G06Q 10/06 701/120 |
| 2013/0066515 A1* | 3/2013 | Sudolsky ............... G07C 5/008 701/32.1 |
| 2013/0232237 A1 | 9/2013 | Zulch, III et al. |
| 2014/0059230 A1* | 2/2014 | Wood ..................... H04L 67/12 709/226 |
| 2014/0065954 A1* | 3/2014 | Ovens .................. G08G 5/0021 455/41.1 |
| 2015/0120097 A1* | 4/2015 | Hathaway ............... B64C 19/00 701/14 |
| 2015/0279126 A1 | 10/2015 | Schindler et al. |
| 2015/0339241 A1 | 11/2015 | Warner et al. |
| 2016/0112071 A1 | 4/2016 | Shelton et al. |

FOREIGN PATENT DOCUMENTS

| | | |
|---|---|---|
| EP | 2 166 778 A2 | 3/2010 |
| WO | 2004049146 A1 | 6/2004 |

OTHER PUBLICATIONS

Extended European Search Report dated May 18, 2020 in European Application No. 15916514.9 (9 pages).

\* cited by examiner

APPARATUS AND METHOD FOR MANUALLY ACTIVATED WIRELESS TRANSFER OF OPERATIONAL AND PERFORMANCE DATA

CROSS-REFERENCE TO RELATED APPLICATIONS

This application is the U.S. national phase entry under 35 U.S.C. § 371 of International Application No. PCT/CN2016/099802, filed on Sep. 23, 2016, the entirety of which is incorporated herein by reference.

FIELD OF THE INVENTION

The invention pertains to manually activated wireless transfer of operational and performance data from a vehicle.

BACKGROUND

Avionics systems generate avionics data pertaining to aircraft operation and performance during aircraft flight. Such data may include air speed, altitude, vertical acceleration, heading, and time. Some systems transfer avionics data wirelessly and automatically upon aircraft landing. The data is relayed to another location for analysis.

Aviation engineers and/or technicians at the airport where the aircraft has landed may require the information immediately to evaluate and service the aircraft. However, automatic wireless systems do not make the data directly available to such personnel in real time. The lack of real time data can be costly because it can delay evaluation of the avionics data and servicing the aircraft by personnel proximate to the aircraft. Thus, the aircraft's return to use and ability to generate revenue can be delayed.

Further, an aircraft may be forced to land at a remote airfield that does not have a communications system permitting such automated wireless transfer of avionics data. For example, the landing field may not be located sufficiently near wireless systems, such as cellular radio systems, to permit such communications. Alternatively, cellular radios on the aircraft may not be compatible with the cellular radio systems proximate to the airfield. Nonetheless, personnel evaluating and servicing the aircraft require efficient access to the avionics data to promptly return the aircraft to service. Therefore, there is a need for another system for conveying such information from the aircraft.

SUMMARY

A manually activated communications system is provided. The manually activated communications system includes a manually activated switch, a monitoring system configured to store operational and performance data of a vehicle, and a radio, coupled to the monitoring system and the manually activated switch, which may be located within or outside the monitoring system. The manually activated switch, monitoring system and radio are contained within the vehicle. The radio is configured to wirelessly transmit the operational and performance data of the vehicle to a portable processing system, proximate to the vehicle, when the vehicle is parked and the manually activated switch is actuated.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments. Reference characters denote like elements throughout figures and text.

DETAILED DESCRIPTION

In the following detailed description, reference is made to the accompanying drawings that form a part hereof, and in which is shown by way of illustration specific illustrative embodiments. However, it is to be understood that other embodiments may be utilized and that structural, mechanical, and electrical changes may be made. Furthermore, the method presented in the drawing figures and the specification is not to be construed as limiting the order in which the individual steps may be performed. The following detailed description is, therefore, not to be taken in a limiting sense.

A manually activated communications system may be used to overcome the above referenced problems. The embodiments of a manually activated communications system have at least two advantages. The manually activated communications system permits engineers and technicians proximate to a vehicle, such as an aircraft, to promptly receive and evaluate operational and performance data from the vehicle, particularly when such data might not have been otherwise conveyed to them such as by the automatic system. Further, such personnel can convey such data to a central computer when they are connected to a wide area network to which the aircraft may not have been able to connect. Although the present invention is sometimes exemplified being used in an aircraft, it is envisioned that it can be used in other vehicles including without limitation automobiles, buses and trains.

Figure 1:
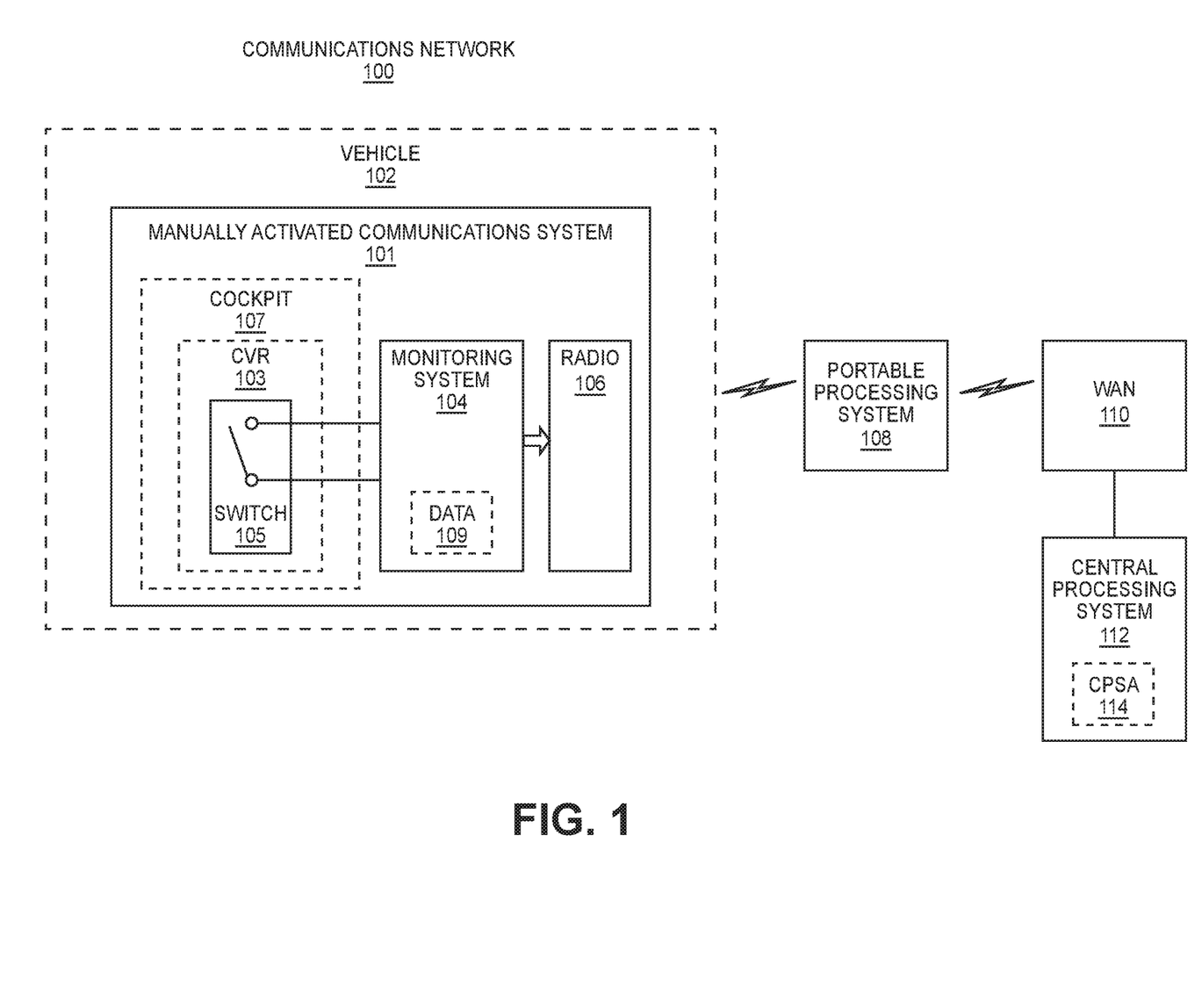
FIG. 1 illustrates a block diagram of an exemplary communications network.

FIG. 1 is a block diagram of one embodiment of a communications network 100. The communications system 100 includes a manually activated communications system 101, a portable processing system 108, a wide area network (WAN) 110 and a central processing system 112. The manually activated communications system 101 is coupled to the portable processing system 108 as further described below. Further, in one embodiment, the portable processing system 108 is coupled to a central processing system 112 either directly or indirectly, e.g., through the WAN 110.

In one embodiment, during normal operation, the manually activated communications system 101 is located within a vehicle 102, such as an aircraft. In another embodiment, the manually activated communications system 101 includes a manually activated switch 105, a monitoring system 104, and a radio 106. In a further embodiment, the monitoring system 104 may be either a flight data acquisition and management system (FDAMS) or an airplane condition monitoring function (ACMF) system. The monitoring system 104 stores the operational and performance data 109 (Data) of the vehicle 102.

In a further embodiment, the manually activated switch 105 is coupled to a monitoring system 104, and the monitoring system 104 is coupled to the radio 106. Thus, the manually activated switch 105 is indirectly coupled to the radio 106. In another embodiment, the manually activated switch 105 may be coupled directly to the radio 106. In yet a further embodiment, the manually activated switch 105 is located in the cockpit 107 of the vehicle 102. In another embodiment, the manually activated switch 105 is the record test button of the cockpit voice recorder (CVR) 103.

The manually activated switch 105 is a switch that is manually activated by an individual such as a pilot, engineer or technician, and can be used to activate a transceiver in the radio 106 so that radio 106 forms a communications link with, and transmits operational and performance data to, the portable processing system 108. The manually activated switch 105 is a mechanical, electromechanical, electronic, opto-electronic, voice activated, software, or any other switch that is directly or indirectly actuated by manual intervention. Thus, when the manually activated switch 105 is actuated it is being triggered by manual intervention.

The radio 106 wirelessly communicates Data 109 to the portable processing system 108. In one embodiment, the portable processing system 108 may be a smart phone, a tablet or a portable computer such as a laptop computer. In an additional embodiment, the Data 109 is encrypted during transmission, e.g. so that it can not be viewed by others.

In another embodiment, the portable processing system 108 is coupled by a wireless link, such as a wireless network, optical or electrical cable, or otherwise to a wide area network (WAN) 110. In a further embodiment, the WAN 110 may be a cellular network, the Internet, and/or any network that extends over a large geographical distance. The WAN 110 is coupled to a central processing system 112 which, for example, may be located at an operations center, e.g. of the entity that owns the vehicle such as an airline, and/or in the 'Cloud,' e.g. at a server facility. In another embodiment, the portable processing system 108 may be directly coupled to the central processing system 112 without the use of the WAN 110. In one embodiment, as will be further described below, the central processing system 112 generates central processing analysis data (CPSA) 114 from Data 109.

Figure 2:
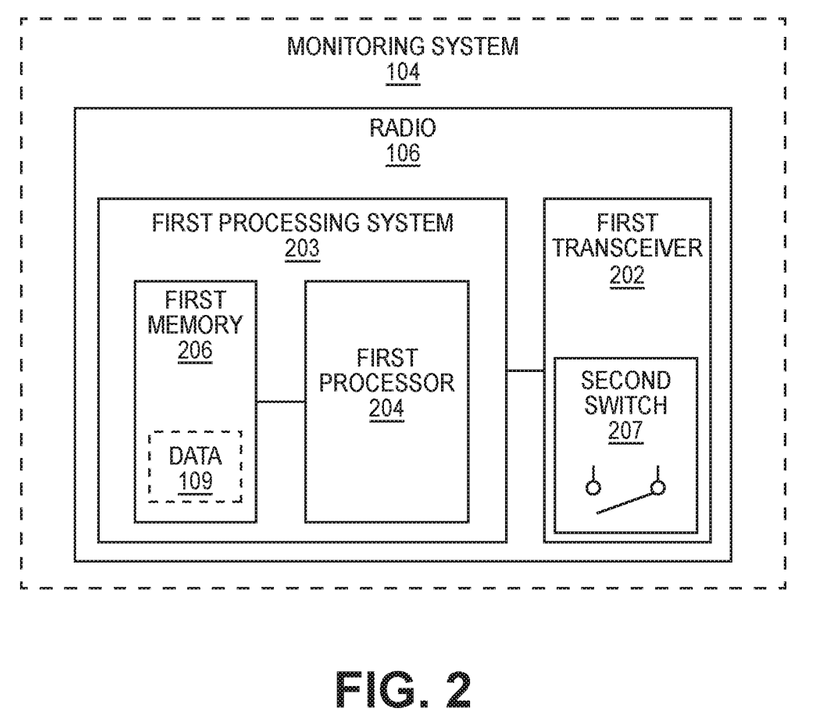
FIG. 2 illustrates a block diagram of an exemplary radio.

FIG. 2 is a block diagram of an exemplary radio 106. In one embodiment, the radio 106 includes a first transceiver 202 coupled to a first processing system 203. In another embodiment the first processing system 203 includes a first processor 204 coupled to a first memory 206. In another embodiment, the first processor 204 and first memory 206 respectively process and store the Data 109 of the vehicle 102. In another embodiment, the first memory 206 stores the Data 109 which is copied from, and is also stored elsewhere, in the monitoring system 104.

In yet another embodiment, the first transceiver includes a second switch 207. The second switch 207 may be actuated in order to turn off the first transceiver 202 should the first transceiver 202 not be disabled automatically as further described herein.

The radio 106 may be within or external to the monitoring system 104. In one embodiment, when the radio 106 is configured to be placed within the monitoring system 104, the radio 106 is implemented in the format of Personal Computer Memory Card International Association (PCM-CIA) card so that it can be easily inserted and removed from the monitoring system 104. For such an embodiment, the monitoring system 104 would have a PCMCIA socket into which the PCMCIA card would be inserted.

Figure 3:
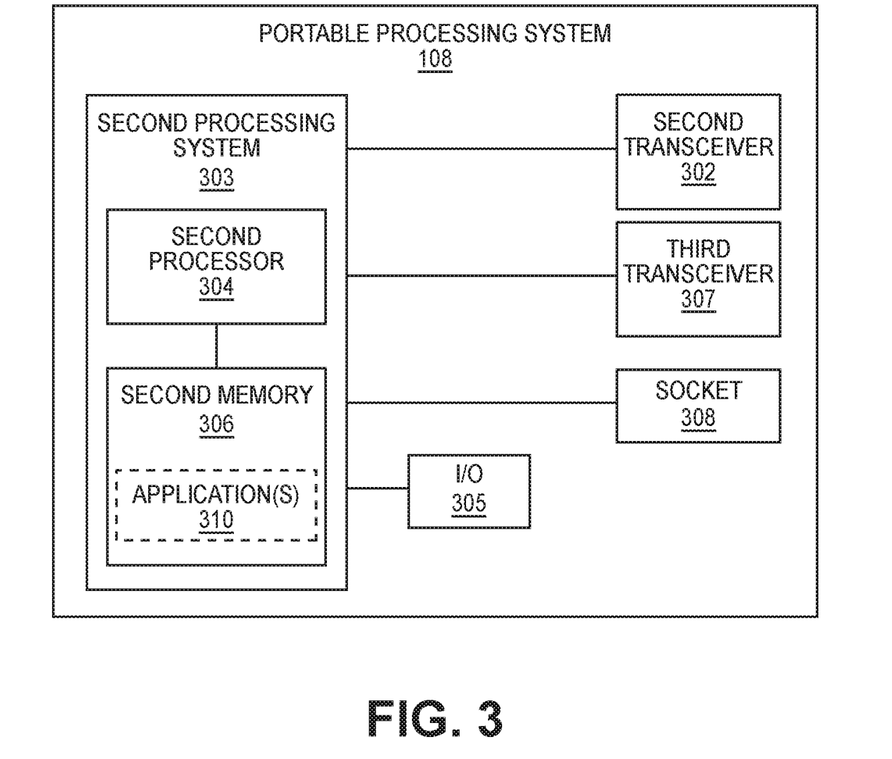
FIG. 3 illustrates a block diagram of an exemplary portable processing system.

FIG. 3 is a block diagram of an exemplary portable processing system 108. The portable processing system 108 includes a second processing system 303, an input/output interface (I/O) 305, a second transceiver 302, a third transceiver 307, and a socket 308. However, in other embodiments, the portable processing system 108 may include just one transceiver, e.g. the second transceiver 302, or three or more transceivers. Further, in other embodiments, the portable processing system 108 may only include a socket 308, or alternatively may include no socket 308 and one or more transceivers.

The second processing system 303 is coupled to each of the I/O 305, the second transceiver 302, the third transceiver 307, and the socket 308. In another embodiment, the second processing system 303 includes a second processor 304 coupled to a second memory 306.

In one embodiment, the portable processing system 108 includes one or more applications 310, e.g. apps, to facilitate analysis of the Data 109. In another embodiment, the application(s) 310 resides in the second memory 306. In yet another embodiment, such application(s) 310 have a user interface permitting an engineer, technician, and/or a third party to create, based upon their experience, a model of the vehicle 102, or portion(s) thereof, being evaluated. In a further embodiment, executing the application(s) 310, e.g. upon command of an engineer or technician, the portable processing system 108 can perform some analysis on the Data 109, e.g. using the model, to identify equipment of the vehicle 102 in need of maintenance, e.g. repair and/or replacement, and to generate maintenance instructions for the engineer(s) and/or technician(s) servicing the vehicle 102.

In one embodiment, the I/O 305 is a keyboard and display. Alternatively, in another embodiment, the I/O 305 is a touch screen acting as both a display and input interface.

In yet another embodiment, the second transceiver 302 is used to form a direct wireless connection with the radio 106, e.g. the first transceiver 202. For example, the second transceiver 302 and the radio 106 communicate using an air interface conforming to the IEEE802.11 standard and operate in ad hoc mode, or communicate using an air interface conforming to the Bluetooth standard. In another embodiment, the second transceiver 302 and the radio 106 may be connected by a repeater, e.g., a wireless router using an air interface conforming to the IEEE802.11 standard and operating in infrastructure mode. In yet another embodiment, the second transceiver 302 and the radio 106 may be connected indirectly, e.g. through a cellular communications network, e.g. having air interfaces conforming to the 2G, 3G, 4G, and/or 5G cellular standards.

Figure 4:
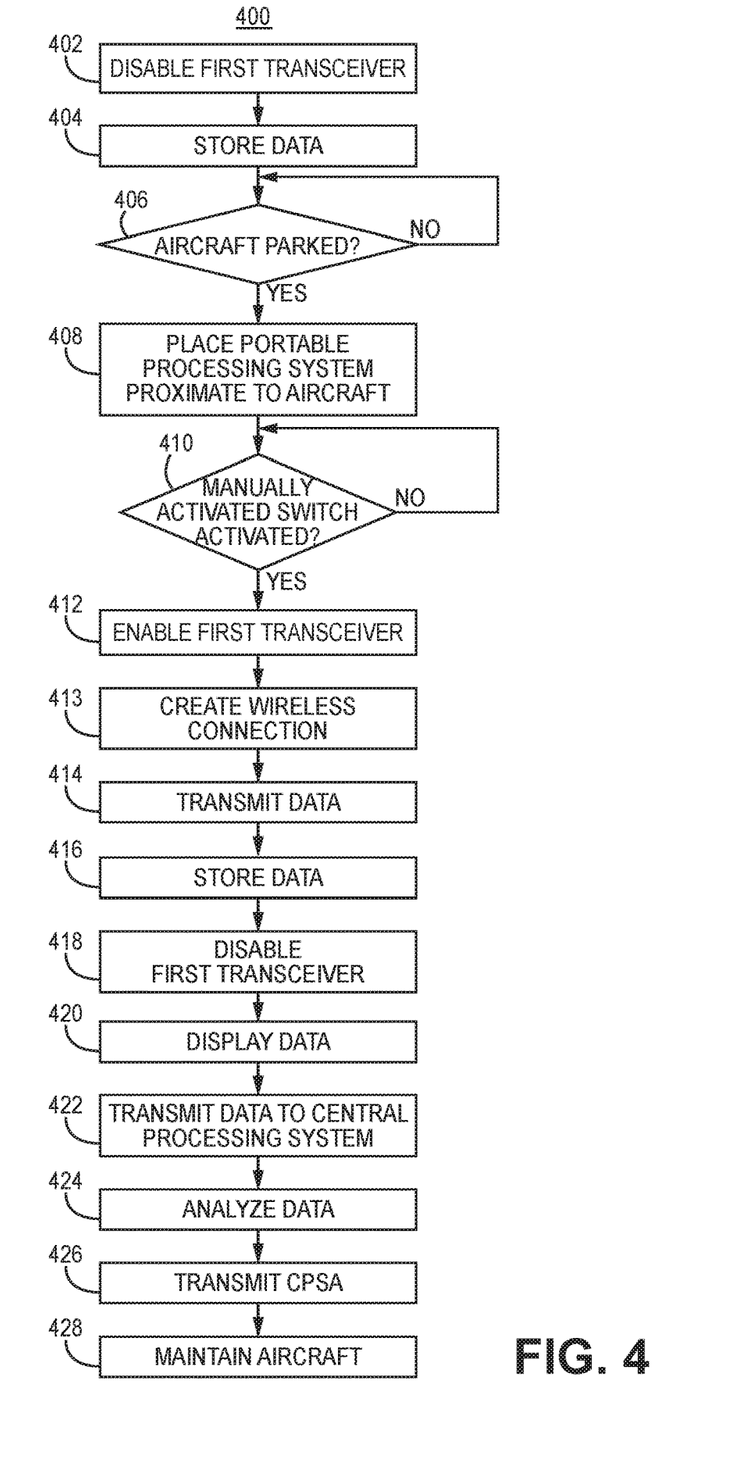
FIG. 4 is an exemplary flow diagram of a method of the operation of a manually activated communications system.

Exemplary operation of the communications network 100 will now be described. FIG. 4 illustrates one embodiment of operation 400 of the communications network 100 used to transfer Data 109 from a vehicle 102 such as an aircraft, and transfer analysis data to engineer(s) and/or technicians servicing the vehicle. For pedagogical purposes, FIG. 4 is described in terms of communications between an aircraft (more generally illustrated above as a vehicle 102) and a portable processing system 108. However, it is understood that the teachings of FIG. 4 are applicable to other embodiments of communications with other types of vehicles. Similarly the pilots, aviation engineers, and technicians referred to below can be operators, engineers, and technicians more generally who control, evaluate and maintain other types of vehicles.

In block 402, during normal operation of the aircraft, e.g. taxiing, takeoff, flight and landing, the first transceiver 202 is disabled, e.g. powered off, so as not to generate electromagnetic interference that could interfere with the operation of other electronics in the.

In block 404, during normal operation of the aircraft, Data 109 is stored in the manually activated communications system 101. In one embodiment, in block 406, a copy of such Data 109 is also stored in the first memory 206 in the radio 106.

Upon landing and parking of an aircraft, i.e. when the aircraft is parked, such Data 109 can be made externally available in accordance with the invention. In block 406, determine if the aircraft is parked. In one embodiment, determination of whether the aircraft is parked is ascertained by evaluating the aircraft's location, speed, engine turbine rotation rate, brake position, and/or one or more other parameters indicative that the aircraft is parked.

If the aircraft is parked, then, in block 408, place the portable processing system 108 proximate to the aircraft. The portable processing system 108 can be placed inside or outside the aircraft, e.g. by an aviation engineer or technician.

An individual, such as a pilot, or an aviation engineer or technician, can then actuate the manually activated switch 105 to commence transfer of Data from the manually activated communications system 101 to the portable processing system 108. Thus, in block 410, determine if the manually activated switch 105 has actuated. If the manually activated switch 105 has been actuated, then in block 412, enable, e.g. power on, the first transceiver 202.

Next, in block 413, wirelessly connect the portable processing system 108 to the radio 106, e.g. create a wireless link between the first transceiver 202 and the second transceiver 302. In one embodiment, such wireless connection can be initiated by the portable processing system 108 at the direction and control of a user, e.g. an aviation engineer or technician, operating the portable processing system 108.

Upon making the connection, then in block 414 transmit the Data 109 from the first transceiver 202, e.g. from the monitoring system 104 and/or the radio 106, to the portable processing system 108, e.g. the second transceiver 302.

In block 416, store the Data 109 in the second processing system 303, e.g. in the second memory 306. At some time after the completion of transmission of the Data 109, in block 418, disable, e.g. power off, the first transceiver 202. In one embodiment, the first transceiver 202 is powered off after a finite period of time, e.g. the time period starting after either when the first transceiver 202 is powered on or after the first transceiver 202 has ceased communicating Data 109. In another embodiment, the finite period of time is ten minutes. In yet another embodiment, if the first transceiver 202 does not power off automatically, then the second switch 207 can be activated to disable the first transceiver 202 (i.e. a portion of the radio 106).

In one embodiment, aviation engineer(s) and/or technician(s) can then review and evaluate the Data 109 on the portable processing system 108. In block 420, display and/or analyze the Data 109 in the portable processing system 108. In one embodiment, the Data 109 and/or the analysis of the Data 109 is displayed on the I/O 305. In another embodiment, the Data 109 is analyzed by the second processing system 303. In yet a further embodiment, the aviation engineer or technician would use the application(s) 310 to perform such analysis of the aircraft. In such an embodiment, for example, the analysis provided by the portable processing system 108 identifies portions of the aircraft which need to be serviced, e.g. replaced or repair, and maintenance instructions informing an aviation engineer or technician how to perform such servicing. For example, such maintenance instructions would describe how to repair and/or replace such equipment.

In another embodiment, aviation engineer(s) and/or technician(s) can transfer the Data and/or analysis of the Data from the portable processing system 108 to the central processing system 112, e.g. upon coupling the portable processing system 108 to the central processing system 112. Thus, in block 422, transmit the Data 109 and/or the analysis of the Data 109 from the portable processing system 108 to the central processing system 112. In one embodiment, this accomplished by wirelessly or physically connecting the portable processing system 108 to the WAN 110. In another embodiment, the Data 109 is encrypted during such communications, e.g. so that it can not be viewed by others. The portable processing system 108 may use, e.g. the second transceiver 302 or the third transceiver 307, to form a wireless connection to the WAN 110, e.g. through an 802.11, Bluetooth, cellular or another wireless network. For example, the second transceiver 302 may be an 802.11 compliant transceiver for short range communications, and the third transceiver 307 may be a cellular transceiver for long distant communications.

Alternatively, the Data 109 can be conveyed by a physical connection to the WAN 110, e.g. by plugging a cable into the socket 308 of the portable processing system 108 and into a device connected to the WAN 110, e.g. a computer, switch or a router. Such a device may be located at the airfield where the aircraft landed, or may be located remotely from the airfield.

In another embodiment, the portable processing system 108 can also be physically delivered proximate to the central processing system 112, and coupled by a wired and/or wirelessly connection to central processing system 112. Thus, in a further embodiment, the Data 109 may be conveyed directly to the central processing system 112 through a wireless connection between the portable processing system 108 and the central processing system 112, e.g. through a wireless connection between a transceiver in the portable processing system 108 and a wireless router coupled to the central processing system 112. Alternatively, the Data 109 may be conveyed physically by plugging a cable, connected to the central processing system 112, into the socket 308 of the portable processing system 108.

In one embodiment, the central processing system 112 evaluates the Data 109. Thus, in block 424 perform analysis, e.g. data mining and/or machine learning, on the Data 109 and/or the analysis of the Data 109 provided by the portable processing system 108, and generate the central processing system analysis 114. In one embodiment, the central processing system analysis 114 identifies how the aircraft should be serviced, e.g. by identifying what aircraft equipment should be maintained, e.g. repaired or replaced, to remedy an existing problem with the aircraft. In another embodiment, the central processing system analysis 114 identifies how aircraft engineer(s) and/or technician(s) should perform such maintenance on the aircraft. In yet another embodiment, the central processing system analysis 114 predicts what aircraft equipment may fail in the future and when and how it should be maintained.

Then, in one embodiment, in block 426, the central processing system 112 transmits the central processing system analysis 114 a portable processing system to facilitate aviation engineer(s) and/or technician(s) to service the corresponding aircraft. For example, such central processing system analysis 114 identifies portion(s) of the aircraft which need to be maintained, e.g. replaced or repair, and instructions informing an aviation engineer(s) and/or technician(s) how to perform such maintenance. In another embodiment, the central processing system analysis 114 is transmitted back to the portable processing system 108 that provided the corresponding Data 109.

In another embodiment, the means of communications from the central processing system 112 to the portable processing system 108 is one of the types described above for the communication of Data 109 from the portable processing system 108 to the central processing system 112. In a further embodiment, the central processing system analysis 114 is encrypted, e.g. so that it can not be viewed by others.

In another embodiment, in block 428, the aviation engineer(s) and/or technician(s) maintain the aircraft in accordance with the analysis provided by the portable processing system 108 and/or the central processing system analysis 114 provided by the central processing system 112.

EXAMPLE EMBODIMENTS

Example 1 includes a manually activated communications system, comprising a manually activated switch; a monitoring system configured to store operational and performance data of a vehicle; a radio, coupled to the monitoring system and the manually activated switch, which may be located within or outside the monitoring system; wherein the manually activated switch, monitoring system and radio are contained within the vehicle; and wherein the radio is configured to wirelessly transmit the operational and performance data of the vehicle to a portable processing system, proximate to the vehicle, when the vehicle is parked and the manually activated switch is actuated.

Example 2 includes the manually activated communications system of Example 1, wherein the vehicle is an aircraft.

Example 3 includes the manually activated communications system of Example 2, wherein the monitoring system consists of one of flight data acquisition and management system and an airplane condition monitoring function system.

Example 4 includes the manually activated communications system of Example 1, wherein the radio is configured to store the operational and performance data of the vehicle.

Example 5 includes the manually activated communications system of Example 1, wherein the radio comprises a first processing system; a first transceiver coupled to the first processing system; and wherein the first transceiver is configured to transmit the operational and performance data of the vehicle when the vehicle is parked and the manually activated switch is actuated.

Example 6 includes the manually activated communications system of Example 5, wherein the first transceiver powers on when the manually activated switch is activated, and powers off automatically after a finite period of time.

Example 7 includes the manually activated communications system of Example 6, wherein the first transceiver comprises a second switch configured to power off the first transceiver in the event the first transceiver does not automatically power off.

Example 8 includes a communications network, comprising a vehicle comprising a manually activated communications system which includes a manually activated switch; a portable processing system proximate to the vehicle; wherein the manually activated communications system stores operational and performance data of the vehicle; and wherein the manually activated communications system is configured to wirelessly transmit the operational and performance data of the vehicle to the portable processing system when the vehicle is parked and the manually activated switch is actuated.

Example 9 includes the communications network of Example 8, further comprising a central processing system coupled to the portable processing system.

Example 10 includes the communications network of Example 8, further comprising a wide area network which couples the portable processing system to the central processing system.

Example 11 includes the communications network of Example 8, wherein the vehicle is an aircraft.

Example 12. The communications network of claim 8, wherein the manually activated communications system further comprises: a monitoring system configured to store the operational and performance data of the vehicle; a radio, coupled to the monitoring system and the manually activated switch, which may be located within or outside the monitoring system; and wherein the radio is configured to wirelessly transmit the operational and performance data of the vehicle to the portable processing system, proximate to the vehicle, when the vehicle is parked and the manually activated switch is actuated.

Example 13 includes the communications network of Example 12, wherein the radio is configured to store the operational and performance data of the vehicle.

Example 14 includes the communications network of Example 12, wherein the radio comprises: a first processing system; a first transceiver coupled to the first processing system; and wherein the first transceiver is configured to be powered on when the vehicle is parked and the manually activated switch is actuated; and wherein the first transceiver powers off automatically after a finite period of time.

Example 15 is a method comprising: storing operational and performance data of a vehicle; determining if the vehicle is parked; placing a portable processing system proximate to the vehicle; actuating a manually activated switch; enabling a first transceiver in the vehicle; transmitting the operational and performance data of the vehicle from the transceiver to a portable processing system; and storing the operational and performance data of the vehicle in the portable processing system.

Example 16 includes the method of Example 15, further comprising disabling the first transceiver.

Example 17 includes the method of Example 15, further comprising transmitting the operational and performance data of the vehicle from the portable processing system to a central processing system.

Example 18 includes the method of Example 17, wherein transmitting the operational and performance data of the vehicle from the portable processing system to the central processing system further comprises transmitting encrypted operational and performance data of the vehicle from the portable processing system to the central processing system.

Example 19 includes the method of Example 17, further comprising analyzing the operational and performance data of the vehicle at the central processing system.

Example 20 includes the method of Example 19, further comprising transmitting the central processing system's analysis of the operational and performance data of the vehicle to the portable processing system.

Example 21 includes the method of Example 20, wherein transmitting the central processing system's analysis of the operational and performance data of the vehicle to the portable processing system further comprises transmitting encrypted central processing system analysis to the portable processing system.

Example 22 includes the method of Example 15, further comprising analyzing the operational and performance data of the vehicle on the portable processing system.

Example 23 includes the method of Example 22, further comprising displaying the analysis of the operational and performance data of the vehicle on the portable processing system.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A manually activated communications system, comprising:
    a manually activated switch;
    a monitoring system configured to store operational and performance data of a vehicle;
    a radio including a first transceiver, coupled to the monitoring system and the manually activated switch, which may be located within or outside the monitoring system;
    wherein the manually activated switch, monitoring system and radio are contained within the vehicle;
    wherein the radio is configured to wirelessly transmit, via the first transceiver, the operational and performance data of the vehicle to a portable processing system, proximate to the vehicle, when the vehicle is parked and the manually activated switch is actuated; and
    wherein the first transceiver powers on when the manually activated switch is activated, and powers off automatically after a finite period of time.

2. The manually activated communications system of claim 1, wherein the vehicle is an aircraft.

3. The manually activated communications system of claim 2, wherein the monitoring system consists of one of flight data acquisition and management system and an airplane condition monitoring function system.

4. The manually activated communications system of claim 1, wherein the radio is configured to store the operational and performance data of the vehicle.

5. The manually activated communications system of claim 1, wherein the first transceiver comprises a second switch configured to power off the first transceiver in the event the first transceiver does not automatically power off.

6. A communications network, comprising:
    a vehicle comprising a manually activated communications system which includes a manually activated switch and a radio including a first transceiver, the radio being coupled to the manually activated switch;
    a portable processing system proximate to the vehicle;
    wherein the manually activated communications system stores operational and performance data of the vehicle;
    wherein the manually activated communications system is configured to wirelessly transmit, via the first transceiver of the radio, the operational and performance data of the vehicle to the portable processing system when the vehicle is parked and the manually activated switch is actuated;
    wherein the first transceiver is configured to be powered on when the vehicle is parked and the manually activated switch is actuated; and
    wherein the first transceiver powers off automatically after a finite period of time.

7. The communications network of claim 6, further comprising a central processing system coupled to the portable processing system.

8. The communications network of claim 6, further comprising a wide area network which couples the portable processing system to the central processing system.

9. The communications network of claim 6, wherein the vehicle is an aircraft.

10. The communications network of claim 6, wherein the manually activated communications system further comprises:
    a monitoring system configured to store the operational and performance data of the vehicle;
    wherein the radio is coupled to the monitoring system; and
    wherein the radio is configured to wirelessly transmit the operational and performance data of the vehicle from the monitoring system to the portable processing system, proximate to the vehicle, when the vehicle is parked and the manually activated switch is actuated.

11. The communications network of claim 10, wherein the radio is configured to store the operational and performance data of the vehicle.

12. A method comprising:
    storing operational and performance data of a vehicle;
    determining if the vehicle is parked;
    placing a portable processing system proximate to the vehicle;
    actuating a manually activated switch;
    enabling a first transceiver in the vehicle;
    transmitting the operational and performance data of the vehicle from the transceiver to a portable processing system;
    storing the operational and performance data of the vehicle in the portable processing system; and
    disabling the first transceiver.

13. The method of claim 12, further comprising transmitting the operational and performance data of the vehicle from the portable processing system to a central processing system.

14. The method of claim 13, wherein transmitting the operational and performance data of the vehicle from the portable processing system to the central processing system further comprises transmitting encrypted operational and performance data of the vehicle from the portable processing system to the central processing system.

15. The method of claim 13, further comprising analyzing the operational and performance data of the vehicle at the central processing system.

16. The method of claim 15, further comprising:
    transmitting the central processing system's analysis of the operational and performance data of the vehicle to the portable processing system.

* * * * *